United States Patent [19]

Christie

[11] Patent Number: 4,736,707

[45] Date of Patent: Apr. 12, 1988

[54] PET TRANSPORT BOX AND INSERT THEREFOR

[76] Inventor: James M. Christie, 1346 Golden Meadow Trail, Oakville, Ontario, Canada, L6H 3J5

[21] Appl. No.: 23,271

[22] Filed: Mar. 9, 1987

[51] Int. Cl.⁴ .................. A01K 1/00; A01K 1/015
[52] U.S. Cl. .................................. 119/1; 119/19; 428/542.8
[58] Field of Search ............... 220/462, 463; 206/204; 119/1, 19; 428/116, 542.8

[56] References Cited

U.S. PATENT DOCUMENTS

| | | | |
|---|---|---|---|
| 2,524,162 | 10/1950 | Chavannes et al. | 206/204 X |
| 3,029,008 | 4/1962 | Membrino | 220/462 |
| 3,154,052 | 10/1964 | Sweeney | 119/1 |
| 3,403,837 | 10/1968 | Farquhar | 428/542.8 X |
| 4,169,539 | 10/1979 | Price | 220/410 |
| 4,321,997 | 3/1982 | Miller | 206/204 |
| 4,335,830 | 6/1982 | Garganese | 220/462 |
| 4,441,626 | 4/1984 | Hall | 426/128 X |
| 4,648,349 | 3/1987 | Larson | 119/1 |
| 4,696,257 | 9/1987 | Neary et al. | 119/1 |

Primary Examiner—Henry F. Epstein
Attorney, Agent, or Firm—Donald E. Hewson

[57] ABSTRACT

A cardboard insert for use in the bottom of a box for containing liquid deposited on the floor of the box has upturned edge flaps with connecting dam portions that are raised above the level of the insert when the edge flaps are erected, to provide a limited liquid retention capability to the box. In the case of the preferred embodiment, for a pet transportation box, the box is made of single ply corrugated board, as is the insert; and one face of the insert is made liquid proof preferably by way of a wax impregnation layer.

17 Claims, 2 Drawing Sheets

PET TRANSPORT BOX AND INSERT THEREFOR

BACKGROUND OF THE INVENTION

This invention is directed to a floor insert for use with a cardboard box, and in particular a liquid retaining floor insert per se and the combination thereof with a pet transport box.

Widespread use is made of boxes fabricated from cardboard, particularly corrugated board, for shipping and transporting purposes. Such is the case also for pets, wherein a knock-down one piece corrugated cardboard stamping is assembled by gluing or stapling, to provide a suitably sized pet transporter box.

Owing to the possibility that the pet may urinate within the box efforts have been made to waterproof the box. One such effort involves the provision of a single ply corrugated board box blank having a waxed face. The waxed face is located on the inside of the box and the vertical box joint glued, or where necessary in view of the waxed surface, secured by stapling. In certain other instances a more expensive arrangement involves the provision of a waterproof plasticised surface. These waterproofed surfaces have the result of strengthening the box in its load carrying role.

However, these earlier attempts have led to one unfortunate result, namely that the urine flows across the surface of the bottom of the box and leaks out specifically at the box corner joints. Thus, the waterproofing of the box inner bottom surface prevents absorption and serves primarily to concentrate the point of outflow of all of the urine.

In instances where the pet is being transported on the seat of a vehicle such as an automobile, or on the lap of a passenger on public transport, wherein the box is tilted at an angle no matter how slight, the degree of concentration of the leakage is doubled, and in some instances quadrupled, with dire consequences for the owner.

Thus, while the mechanical integrity of the box is substantially preserved, certain undesired results for the user are grossly fulfilled.

It may well be said that there is a long felt need for protection against leaking pet boxes.

DESCRIPTION OF THE INVENTION

The present invention provides a planar foldable insert for use as a liquid containing bottom within a rectangular section box of predetermined floor shape and size, said insert having four foldable edge flaps of predetermined, substantially uniform width bounding a central floor portion, being delineated therefrom by fold lines defining said edge flaps, and dam means located between and interconnecting adjacent inner end portions of said foldable edge flaps at the respective four corners of said central floor portion, so that upon folding said edge portions upwardly at said fold lines said dam means extend in elevated relation above the surface of said central floor portion in interconnected sealing relation with at least an innermost portion of each said edge flap and said central floor portion, to provide in use an elevated dam in liquid containing relation with each corner of said central floor portion.

In the preferred embodiment the corner dam means interconnecting the foldable edge flaps are struck out of the cardboard blank, being unitary with the blank.

However, it is contemplated that in an alternative arrangement the corner dam means may comprise pieces of suitable tape adhering in bridging relation with the ends of the edge flaps. The use of such adherent tape in turn can serve one or more secondary purposes, namely; to adhere to the inner surface of the box corners, upon insertion therein, thus securing the cardboard insert within the box; and/or to adhere partially to itself, thus serving to hold the insert in a preformed traylike conformation.

In the case of the preferred embodiment, it has been found that single wall corrugated cardboard having one face thereof protected by a wax layer, wherein the dam means bridge the corner ends of the edge flaps and are unitary therewith, provides a low cost, effective floor liner for a box of appropriate size. However, a single layer board of suitable strength and stiffness also may be used.

In the case of pet transportation—and especially domestic cats and the smaller breeds of dogs—to which this invention is predominantly directed, there are two or more sizes of box provided for transporting cats (or small dogs), so that pets up to about 20 pounds weight can be transported.

In addition to protecting the floor of the box against damping, to thereby maintain the dry strength thereof, the liner also contributes its structure in load distributing relation with the box to effectively strengthen the floor of the box.

In accordance with the invention, the interior dimensions of the liner i.e., the length and the breadth of the central floor portion defined by the fold lines, are dimensioned in relation to the inner floor dimensions of the box with which it is used, to afford a clearance of some one quarter inch therebetween. This results in an outlying attitude of the edge flaps of the insert, such that the outer edges thereof conform closely in pressing relation with the inner surface of the box wall, thus diminishing access for the claws of a cat in destructive relation therewith. This outlying characteristic of the up-folded edge flaps is further enhanced by the additional portions constituting the dam means, which also contributes somewhat in urging the edge flaps to fold outwardly in pressing relation against the box walls inner surfaces.

BRIEF DESCRIPTION OF THE DRAWINGS

Certain embodiments of the invention are described, reference being made to the accompanying drawings, wherein.

DETAILED DESCRIPTION OF THE EMBODIMENTS

Figure 1:
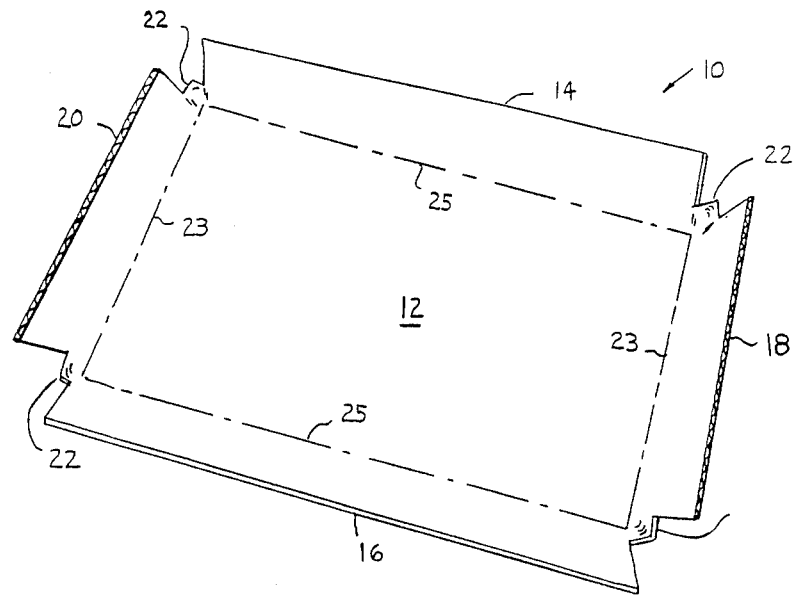
FIG. 1 is a general view of the subject foldable insert.

Referring to FIG. 1, the subject insert 10 is stamped in the usual fashion from single ply corrugated cardboard and has a central floor portion 12, a pair of side edge flaps 14,16; a pair of end edge flaps 18,20 and dam means 22 located in each corner thereof and connecting the end portions of the adjacent edge flap ends. Fold lines 23,23, 25,25, delineate the floor portion 12 and the edge flaps 14, 16, 18 and 20.

When the edge flaps 14, 16, 18 and 20 are folded upwardly, upon insertion of the insert 10 into a box 30 of predetermined size, the dam means 22 extend upwardly above the top surface of floor portion 12, to form a liquid reservoir therewith, within which urine or other liquid can be contained.

The box 30 has a bottom 32 (See also FIG. 3), sides 34, 36, 38, 40 and foldable lid portions 42, 44, 46 and 48. A series of vents provide ventilation for the box 30.

Figure 3:
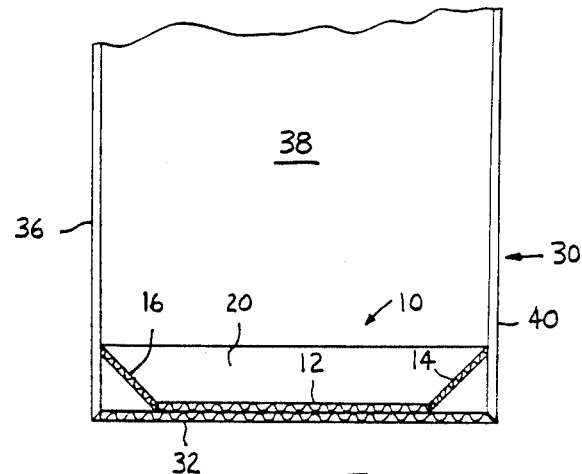
FIG. 3 is a cross section of a portion of a transportation box having the subject insert in positioned relation therein.
Figure 2:
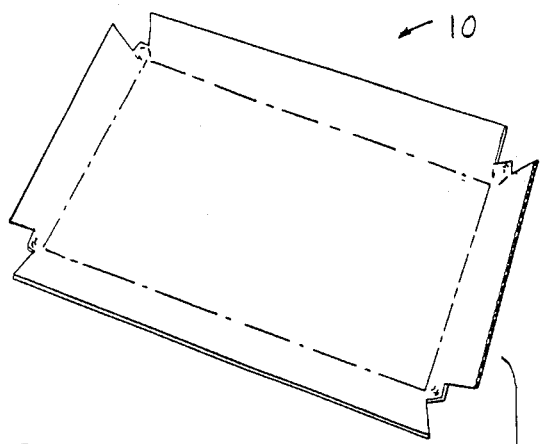
FIG. 2 is a general view of the subject insert prior to insertion thereof within a pet transportation box.
Figure 2:
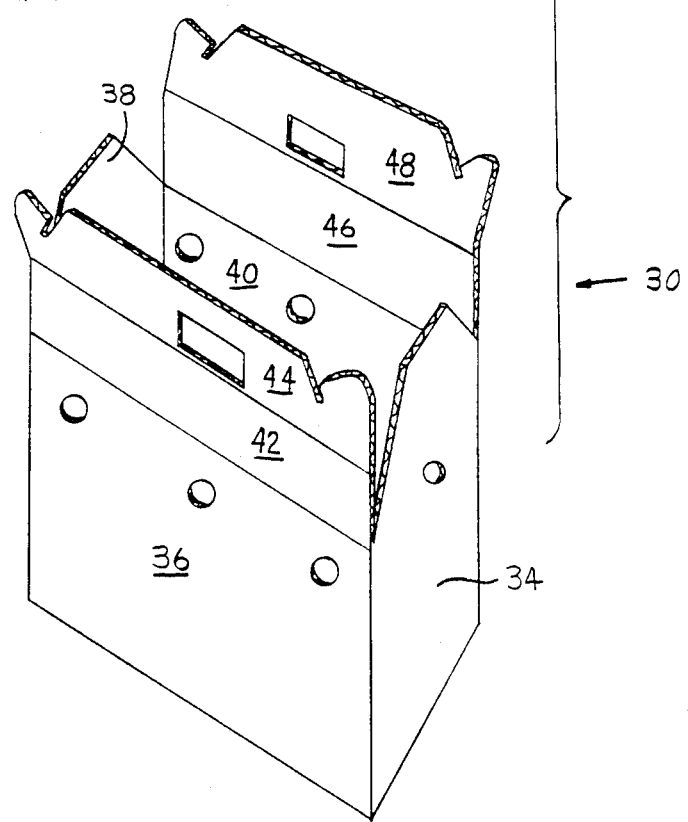

Referring to FIG. 3 it will be seen that the floor portion 12 is undersized in regard to the bottom 32 of box 30. Hence the side flaps 14, 16 and end flaps 18, 20 are inclined with the top edges thereof in pressing relation against the inner surfaces of box sides 36, 40, 34 and 38.

The use of an absorbent pad in combination with the subject insert is contemplated.

It is further contemplated to position the break lines such that the impermeable, treated face of the insert 10 is on the bottom thereof, and to locally rupture the upper face of insert 10, to permit penetration of urine or other liquid whereby the insert serves also as a throwaway holding receptacle. Otherwise with the impermeable face of insert 10 positioned uppermost, the insert is generally re-usable.

A yet further embodiment, having both faces of the insert treated to be impermeable, with one face thereof ruptured or perforated to permit liquid drainage therein, enables the transported animal to remain substantially dry-footed. Such an insert may be made reversible,to permit selection of a preferred fuction by the user.

What is claimed is:

1. A planar foldable insert of liquid permeable construction for use a liquid containing bottom within a rectangular section pet transportation box of predetermined floor shape and size, said insert having a liquid resistant, non-metallic, impermeable, integral surface, and four foldable edge flaps of predetermined substantially uniform width bounding a central floor portion, being delineated therefrom by fold lines defining said edge flaps, and reflexible dam means located between and interconnecting adjacent inner end portions of said foldable edge flaps at the respective four corners of said central floor portion, so that upon folding said edge portions upwardly at said fold lines said dam means extend in elevated relation above the surface of said central floor portion in interconnected sealing relation with at least an innermost portion of each said edge flap and said central floor portion, to provide in use an elevated dam in liquid containing relation with each corner of said central floor portion.

2. The insert as set forth in claim 1, said dam means comprising unitary portions of said insert.

3. The insert as set forth in claim 1, said liquid resistant surface comprising a wax finish.

4. The insert as set forth in claim 1, said liquid resistant surface comprising a plastic finish.

5. The insert as set forth in claim 1, said central floor portion having at least one major dimension thereof smaller than the corresponding major dimension of said rectangular section box, whereby upon insertion of said insert in folded relation therein, said edge flaps bounding said smaller major dimension are inclined outwardly in conforming relation at the outer edges thereof with the adjacent respective inner surfaces of said box sides.

6. The insert as set forth in claim 5, all of said four edge flaps, in use being pressed in conforming relation at the outer edges thereof with respective adjacent inner surfaces of said box sides.

7. The insert as set forth in claim 5, said dam means serving to secure said edge flaps in said outward conforming relation.

8. The insert as set forth in claim 1 in combination with said box.

9. The insert as set forth in claim 1 in combination with said box, wherein said box is designed for transporting pets therein.

10. The insert as set forth in claim 8 in combination with an absorbent pad inserted therein.

11. The insert as set forth in claim 1 wherein said insert is stamped from corrugated board.

12. The insert as set forth in claim 1, said corrugated board being single wall corrugated cardboard, and having a liquid impervious surface on at least one face thereof.

13. The insert and box combination as set forth in claim 7 wherein said insert and said box are of corrugated cardboard.

14. The insert as set forth in claim 1, said liquid resistant surface being substantially impermeable, and located on the top surface of said insert.

15. The insert as set forth in claim 1, said liquid resistant surface being substantially impermeable, and located on the bottom surface of said insert, said insert top surface being locally ruptured to facilitate entry of liquid in stored relation within said insert.

16. The insert as set forth in claim 1, said liquid resistant surface being substantially impermeable, said edge portions being electively bendable to position said impermeable surface upwardly or downwardly on said insert.

17. The insert as set forth in claim 16 wherein both faces of said insert are substantially impermeable with one said face having discontinuities in the surface thereof to permit the entry of liquid therein.

* * * * *